April 28, 1964      A. DUERKSEN      3,130,446
TIRE MOLD LOADER

Filed July 27, 1961      5 Sheets-Sheet 1

INVENTOR
*Arnold Duerksen*

BY *Webster & Webster*
ATTORNEYS

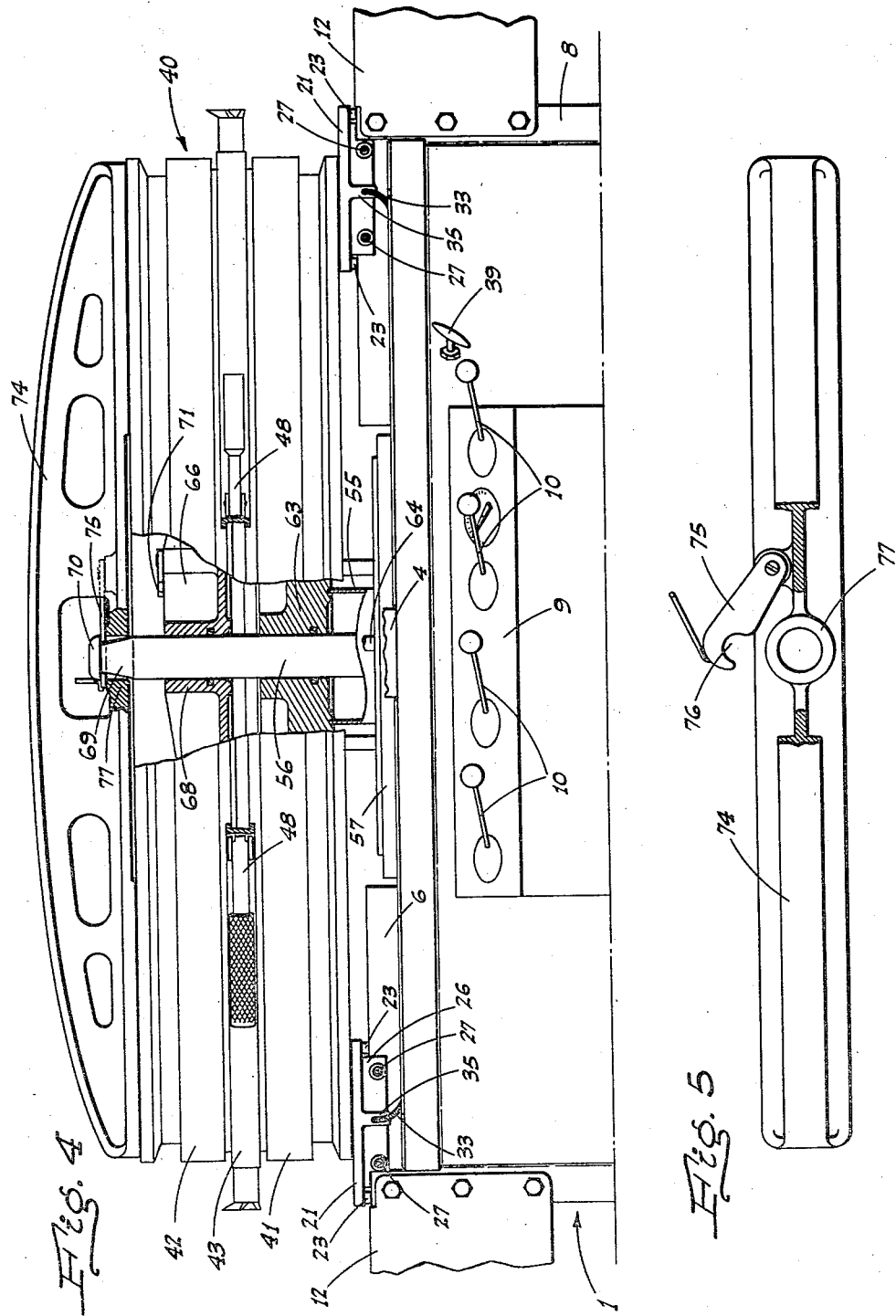

United States Patent Office 3,130,446
Patented Apr. 28, 1964

3,130,446
TIRE MOLD LOADER
Arnold Duerksen, Lodi, Calif., assignor to Super Mold Corporation of California, a corporation of California
Filed July 27, 1961, Ser. No. 127,316
2 Claims. (Cl. 18—2)

This invention relates in general to apparatus employed in the tire retreading industry.

In particular, the invention is directed to, and it is a major object to provide, a novel apparatus for introducing or loading a prepared tire, with the new tread rubber or "camelback" thereon, into a retread vulcanizing mold of the type comprising mating annular matrix halves which are axially separable but normally locked together by a releasable locking ring surrounding the mold in engagement with such matrix halves.

Another object of the invention is to provide a tire mold loader, as above, which is adapted to receive and support the mold horizontally in a predetermined plane; to precisely locate the mold in concentric relation to certain vertical-axis tire loading instrumentalities embodied in the loader; and to releasably lock the lower matrix half in place and so that the upper matrix half—upon release of the locking ring—can be removed to permit the prepared tire to be placed in said lower matrix half by such vertical-axis instrumentalities.

Still another object of the invention is to provide a tire mold loader, as above, which includes—in association with a mold supporting structure—a novel mechanism for locating the mold on said structure and locking the lower matrix half in place thereon; such structure and mechanism being arranged for reception of molds of different diameters.

An additional object of the invention is to provide a tire mold loader wherein the vertical-axis instrumentalities are operative, after removal of the upper matrix half, to receive and center the tire above the supported and locked-in-place lower matrix half; to then reduce the outside diameter of the tire; and to thereafter lower the reduced-diameter tire into said lower matrix half, and which is followed by replacement of the upper matrix half on said lower matrix half whereby to complete the enclosure of the tire in the mold. The apparatus includes, with said instrumentalities, novel means to forcefully mate the replaced upper matrix half on the lower matrix half so as to permit of ready re-engagement of the previously released locking ring.

A further object of the invention is to provide a tire mold loader which includes dual cranes, one for the mold and the other for the tire; the mold, and frequently the tire, being quite heavy and cumbersome, and thus difficult to otherwise handle.

A still further object of the invention is to provide a tire mold loader which is relatively simple and compact, readily manufactured, convenient to use, practical, reliable, and effective for the intended purpose.

These objects are accomplished by means of such structure and relative arrangement of parts as will fully appear by a perusal of the following drawings, specification, and claims.

In the drawings:

FIG. 4 is an enlarged fragmentary front elevation showing the upper matrix half as replaced and engaged from above by the pressure bar; the view being partly broken away and partly in section.

FIG. 5 is a plan view, partly in section, of the pressure bar, detached.

Figure 1:
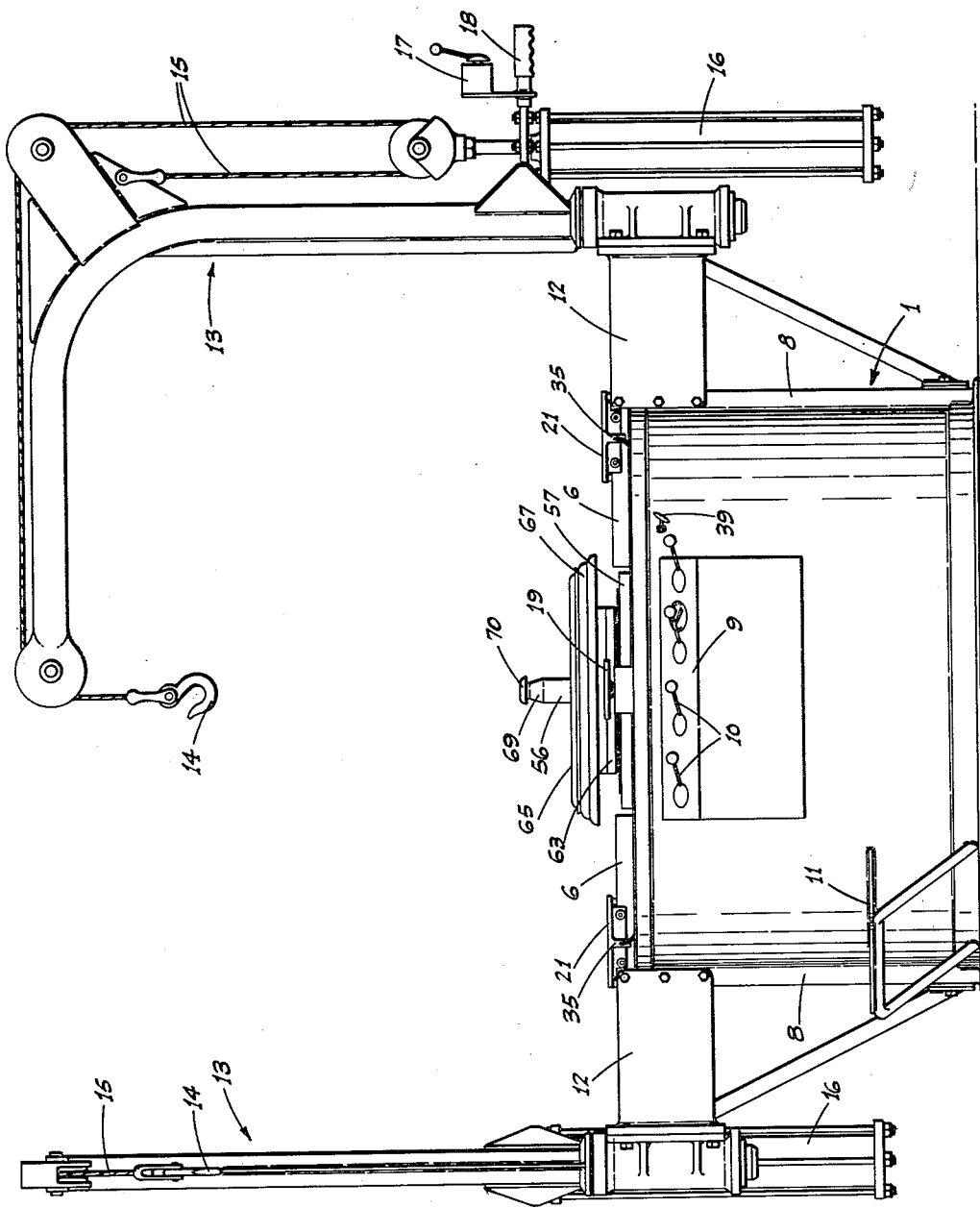
FIG. 1 is a front elevation of the tire mold loader with the upper tire bead engaging disc, and the pressure bar omitted; one crane being shown overhanging the loader, and the other crane projecting forwardly.

In the drawings, the valve regulated fluid conduit systems, as used for the actuation or control of certain working parts of the apparatus, are omitted for the purpose of clarity.

Referring now more particularly to the drawings and to the characters of reference marked thereon, the tire mold loader comprises an upstanding, floor-supported, cylindrical body or frame indicated generally at 1. A central horizontal ring 2 is rigidly secured at the top of frame 1 by means including internal braces 3, and a plurality of circumferentially spaced top bars extending from such ring outwardly to the upper and outer edge of said frame; there being a front top bar 4, a rear top bar 5, and diametrally opposed side top bars 6.

The side top bars 6 connect at their outer ends with posts 8 secured on opposite sides of the cylindrical frame 1; the latter being fitted on the outside and at the front with a panel or console 9 from which projects the operating handles 10 of the valves included in the fluid conduit systems and which—as previously indicated—are not shown. An operator's foot platform 11 extends outwardly from frame 1 to one side of the panel 9.

A horizontal stub beam 12 projects laterally outwardly from the upper portion of each post 8 and supports a swinging jib crane, indicated generally at 13; each crane including a hoisting hook 14, cable 15, cable actuating power cylinder 16, control valve 17, and a crane positioning handle 18 by means of which the crane can be swung between a position with the hook 14 substantially centered above the frame 1 and a remote position away therefrom.

Figure 7:
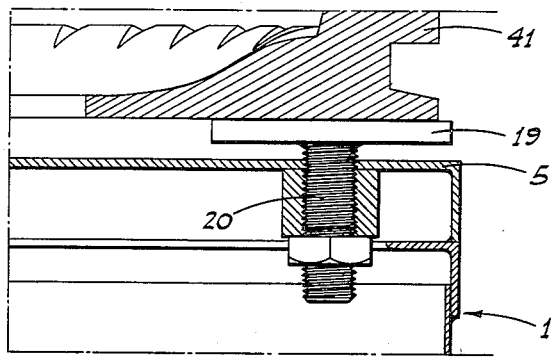
FIG. 7 is a fragmentary sectional elevation on line 7—7 of FIG. 2.

The front and rear top bars 4 and 5 are each provided, adjacent their outer ends and thereabove, with a horizontally disposed, circular, mold supporting pad 19 vertically adjustably mounted by a depending, nut-locked center screw 20, as shown in FIG. 7. Similarly, the side top bars 6 are each provided with a horizontally disposed, mold supporting pad 21; the latter being rectangular in plan, overlying the outer end portions of the related top bar 6, and being fixedly secured thereto by bolts 22. The pads 21 overlie the top bars 6 in spaced relation; spacer collars 23 surrounding the bolts 22 between the pads and bars. The pads 21 are dimensioned and positioned so that they project forwardly of the top bars 6; the spacing above the latter of such pads, together with the forward projection thereof, being for the purpose hereinafter described. As so mounted, the pads 21 are above the top of frame 1 as closed by filler plates 7.

Each pad 21, in addition to providing a mold support, is an included part of a mold locating and locking unit, and as such units are of the same construction, the following description of one will suffice.

A straight row of longitudinally spaced holes 24 is formed in each pad 21 radially of the apparatus; the rows of holes in the separate pads 21 being alined in a transverse diametral plane, and such holes of each row having like spacing.

Figure 8:
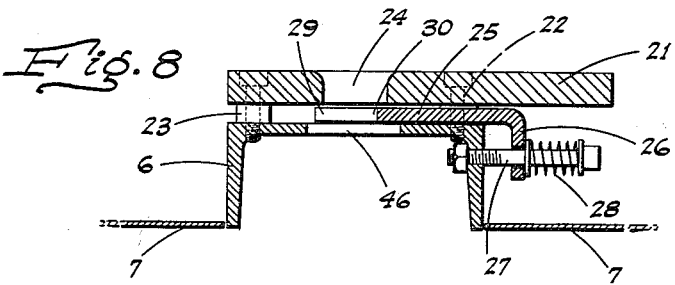
FIG. 8 is a fragmentary transverse sectional elevation on line 8—8 of FIG. 2 and shows one of the units of the locating and locking mechanism before engagement with a mold pin.

A locking plate 25 is disposed between the pad 21 and the related top bar 6 for sliding movement transversely of the latter; there being a flange 26 depending from the forward edge of such locking plate 25, and which flange is slidably guided on headed bolts or rods 27 projecting forwardly from the front of the top bar 6. Compression springs 28 on rods 27 between the heads thereof and flange 26 normally but yieldably urge the locking plate 25 to a predetermined advanced position beneath pad 21. See FIG. 8.

Figure 2:
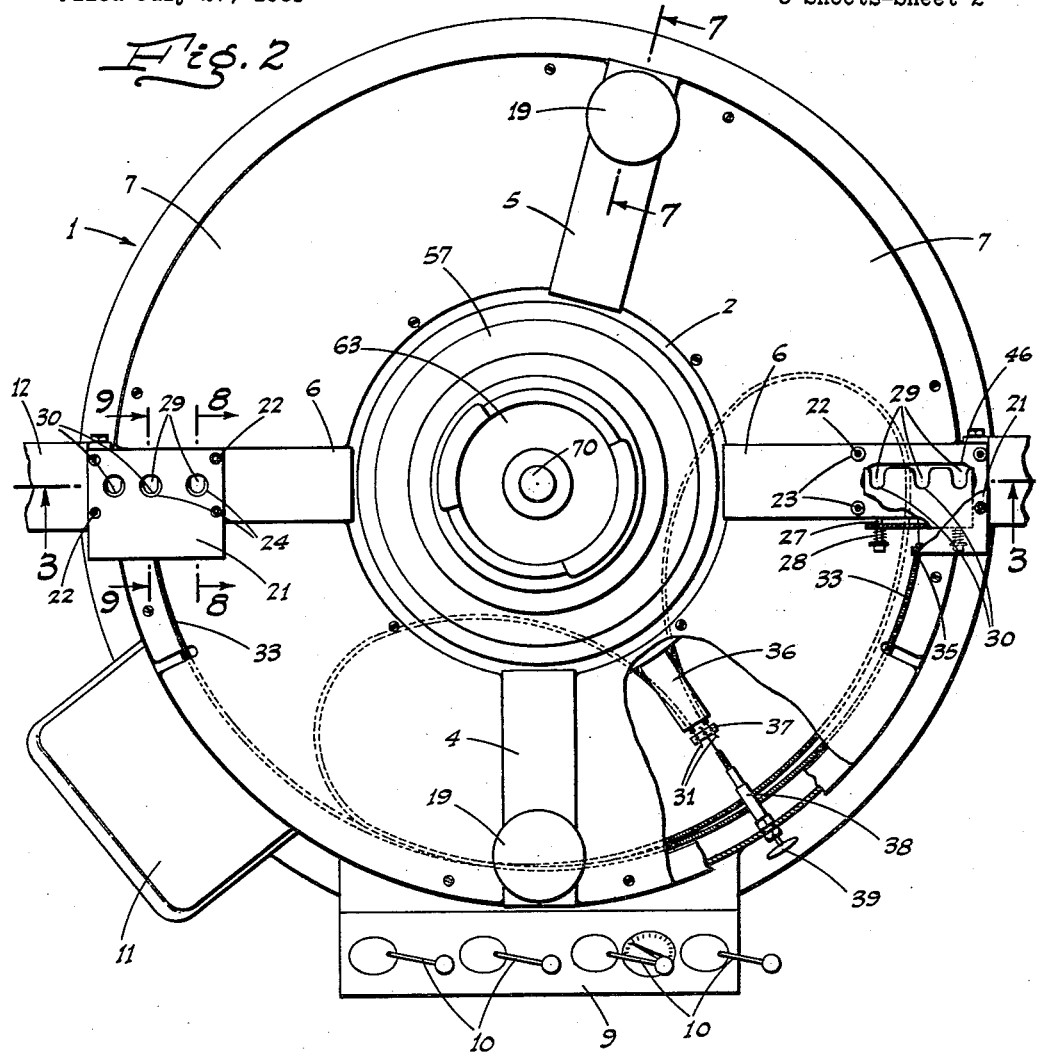
FIG. 2 is a plan view of the tire mold loader as in FIG. 1 but with the cranes omitted; the view being partly broken away and partly in section.

At its inner or rearward edge portion, the locking plate 25 is formed with a row of U-shaped notches 29 corresponding to and generally registering with the holes 24 in pad 21, but which notches are dimensioned to provide saddles 30 slightly smaller than the diameter of the holes 24. See FIG. 2.

Figure 9:
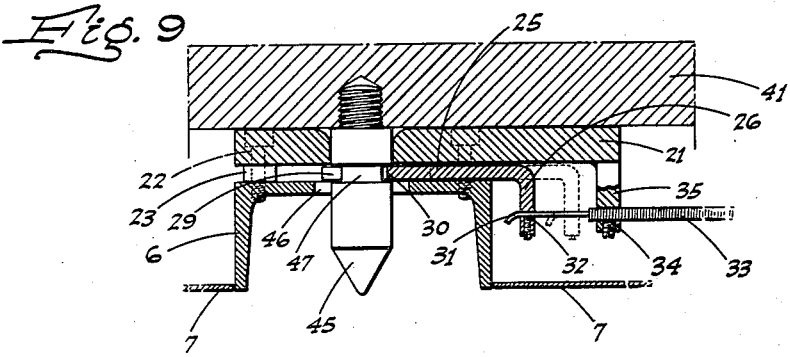
FIG. 9 is a similar view but taken on line 9—9 of FIG. 2 and shows such unit as engaged with a mold pin.

The locking plate 25 is adapted to be retracted in a forward direction, and later re-advanced in a rearward direction, by a spring steel control wire 31 attached to flange 26 intermediate the rods 27, as at 32. This control wire 31 is guided in a helically wound, flexible metallic conduit 33 attached at one end, as at 34, to an ear 35 depending from the forward edge of pad 21. See FIG. 9. The wire 31 and flexible conduit 33 thence extend to a radial neck 36 on ring 2; the flexible conduits of both of the mold locating and locking units being secured to said neck 36, with the two control wires 31 exposed and connected together by a cross member 37. In turn, such cross member 37 is connected to a pull-push device 38 mounted on frame 1 and having a handle 39 exteriorly thereof. See FIG. 2. By grasping handle 39 and pulling outwardly, an operator—through the described arrangement—can cause simultaneous retraction of both locking plates 25, and thereafter by pushing inwardly can re-advance the same.

The tire mold, with which the present apparatus is adapted to be employed, is indicated generally at 40 and includes a lower annular matrix half 41, a mating upper annular matrix half 42, and a releasable locking ring 43 which normally secures such matrix halves together; each matrix half—as usual—having tread design fins 44 on its inner face.

In order to load a prepared tire into the mold 40, and assuming it to be initially empty as at the start of a day's operations, such mold is lifted with chains (not shown) and by one of the cranes 13 from an adjacent transport dolly or the like and then swung to a position directly above the pads 19 and 21, and with the mold horizontally disposed. The mold is then lowered until the lower matrix half 41 rests flush on such pads 19 and 21; the pads 19 having previously been adjusted to the level of pads 21.

Such lower matrix half 41 is provided at opposite sides with diametrally alined, downwardly extending, taper pointed locating and locking pins 45 which, when the mold is lowered and after retraction of the locking plates 25 so that the notches 29 are clear of the holes 24 in pads 21, pass through corresponding ones of said holes and enlarged registering slots 46 in the top bars 6. This is followed—when the lower matrix half 41 is seated on the pads 19 and 21—by re-advance of the locking plates 25 whereupon the saddles 30 defined by notches 29 enter circumferential grooves 47 in said pins 45. In this manner, the mold is effectively horizontally supported, precisely located on frame 1 concentric to the vertical axis of ring 2 for the purpose to later appear, and with the lower matrix half locked against lateral as well as upward displacement.

Nextly, the locking ring 43 is released by uncoupling its latch indicated in part at 48, whereupon the crane 13, previously used to position the entire mold on the apparatus, is employed to lift the upper matrix half 42 and to move it to an out-of-the-way position. The locked-in-place lower matrix half 41 is then exposed and ready for reception of the prepared tire.

Figure 3:
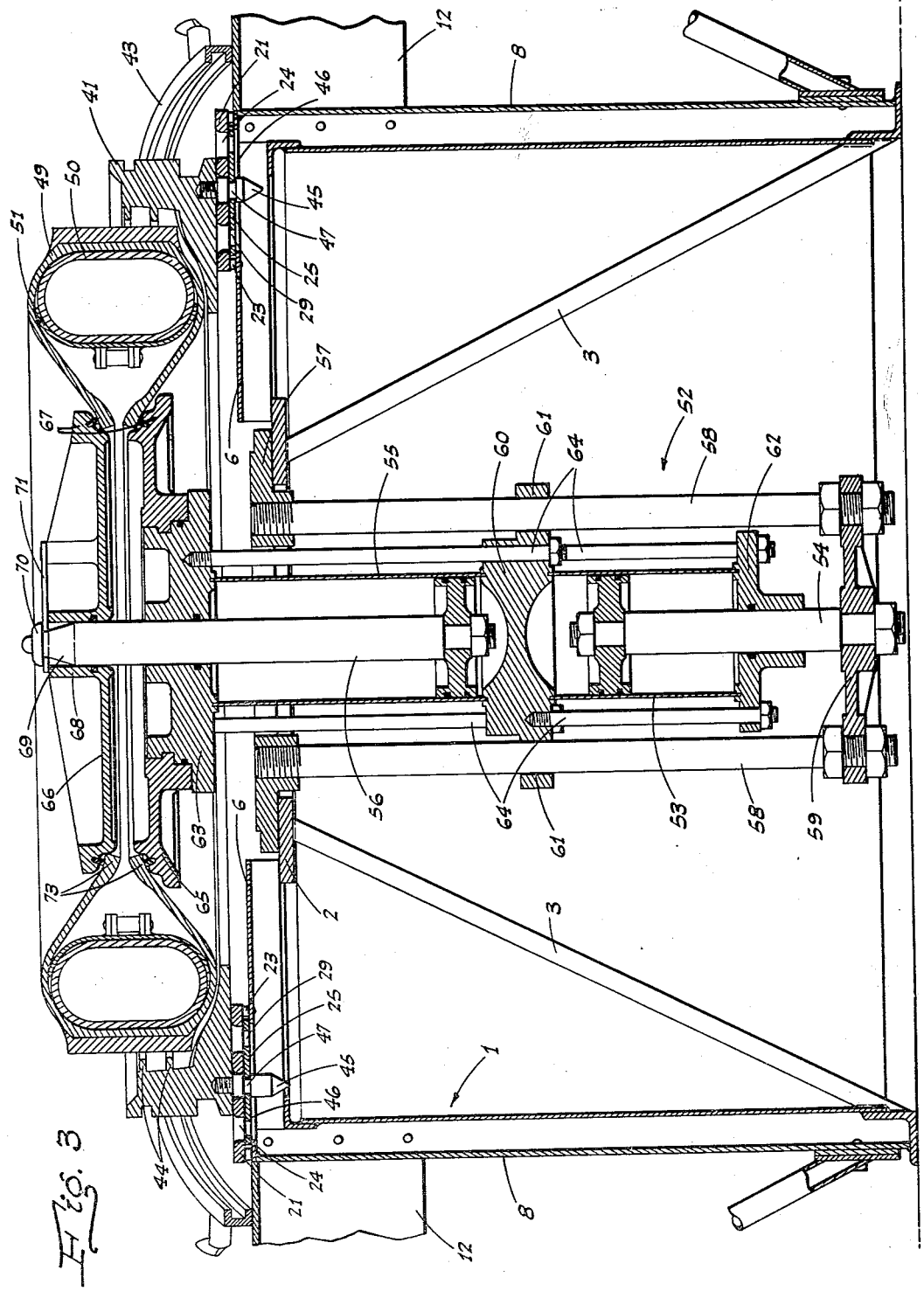
FIG. 3 is an enlarged sectional elevation on line 3—3 of FIG. 2; the view illustrating a tire as lowered into the locked-in-place lower matrix half and preparatory to replacement of the upper matrix half.

The prepared tire, indicated at 49 and having an inside curing bag 50 and inside curing rim 51 therein, is introduced into the lower matrix half 41, as shown in FIG. 3, by means of the central vertical axis instrumentalities, and in the manner, now to be described.

A tandem power cylinder assembly, indicated generally at 52, is mounted centrally and vertically in the frame 1; such assembly including—in opposed relation—a lower double-acting power cylinder 53 having a downwardly projecting piston rod 54, and an upper double-acting power cylinder 55 having an upwardly projecting piston rod 56.

A mounting collar 57 is secured on ring 2 in surrounding relation to the top portion of the upper power cylinder 55, and parallel guide rods 58 are attached to and depend from said collar 57 to the sides of the tandem power cylinder assembly 52; such guide rods being connected at their lower ends by a cross head 59 and to which the lower end of piston rod 54 is secured.

At adjacent ends, the power cylinders 53 and 55 have a common head 60 guided, as at 61, on the rods 58; the cylinder 53 having a lower head 62, and the cylinder 55 having an upper head 63. The heads 60, 62 and 63 are interconnected in fixed relation to each other by tie rods 64.

When both of the power cylinders are contracted, the upwardly projecting piston rod 56 extends to an upper end termination in a plane adjacent but above the lower matrix half 41 as seated on pads 19 and 21 as shown in FIG. 3.

Figure 6:
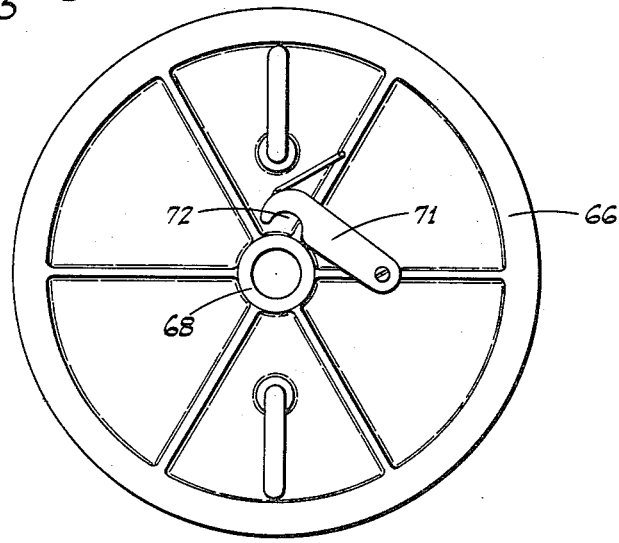
FIG. 6 is a plan view of the upper tire bead engaging disc, detached.

The cylinder head 63 is an included and central part of a lower tire bead engaging disc 65 which is thus fixed for travel with the power cylinder 55. An upper tire bead engaging disc 66 is adapted to be disposed above disc 65 in cooperating and complementary relation; both discs having annular, tire bead engaging seats 67 at the periphery thereof. The disc 66 is fitted on top with lifting handles as shown in FIG. 6.

The piston rod 56 is, of course, slidable through the head 63, and the upper tire bead engaging disc 66 includes a hub 68 adapted to receive the top part of said rod 56; the latter, immediately adjacent its upper end, having a tapered reduced diameter neck 69 which defines a head 70. A swinging latch 71, notched as at 72, is mounted on the upper disc 66 and adapted to engage the neck 69 below head 70 whereby to removably secure said upper disc 66 on the top part of rod 56 and above the lower disc 65.

At the start, the upper disc 66 is detached and the power cylinders 53 and 55 are contracted. The lower power cylinder 53 is then extended to raise the upper power cylinder 55 and the lower tire bead engaging disc 65, until the latter occupies a position above the locked-in-place lower matrix half 41. Thereafter, the tire 49 is lifted by the other crane 13 (the upper and removed matrix half 42 remaining connected to the aforesaid one crane) and the tire—which is horizontally disposed—is swung to a position over and then let down onto the lower disc 65 and with the latter engaging the lower tire bead 73.

This is followed by manual placement of the upper disc 66 on the tire and in engagement with the upper tire bead 73. With the tire thus disposed between and centered by the discs 65 and 66, the upper power cylinder 55 is extended; i.e. the piston rod 56 is run upwardly until it passes through the hub 68, whereupon the swinging latch is engaged about neck 69 and beneath head 70.

Nextly, the upper power cylinder 55 is contracted and with the downward motion of the piston rod 56, the upper disc 66 is drawn in the direction of the lower disc 65, resulting in the tire beads 73 being forced toward each other. When this occurs, the sidewalls of the tire are drawn about the edge portions of the inside curing rim 51, which produces a substantial reduction in the outside diameter of the tire. If desired to further reduce the outside diameter of the tire, a tendency to vacuum may be created in said tire as well as in the inside curing bag 50 in the manner contemplated for example in co-pending application Serial No. 40,434, now Patent No. 3,015,845; seals—as shown—being included with the discs 65 and 66 to close the interior of the tire to atmosphere.

After the tire has been reduced in outside diameter, and while maintaining such reduction, the lower power cylinder 53 is contracted. This imparts downward movement to the upper power cylinder 55 and the tire bead engaging discs 65 and 66, and lowers the tire into the lower matrix half 41 as shown in FIG. 3. As the tire is of reduced diameter, it freely enters said lower matrix half 41 and without the new tread rubber or "camelback" scuffing on the tread design fins 44.

After the tire has been seated in the lower matrix half 41, the upper matrix half 42 is replaced on the latter by said one crane 13; said upper matrix half 42 then occupying the general position shown in FIG. 4.

The tire in the then assembled mold may prevent the upper matrix half 42 from fully seating on the lower matrix half 41, and in order to assure of positive mating of such matrix halves a horizontal spanner or pressure bar 74 is employed as follows:

Such pressure bar 74 has a straight and flat bottom; is of a length approximating the diameter of the mold; and is fitted on top with a swinging latch 75 notched as at 76 for engagement with the neck 69 of piston rod 56 when projected—as hereinafter described—through a central hub 77 included in said bar.

The swinging latch 71 of the upper disc 66 having first been released, the pressure bar 74 is manually placed, in spanning relation, atop the upper matrix half 42 diametrally thereof, and then the upper power cylinder 55 is extended sufficient to project the piston rod 56 upwardly (sliding through the discs 65 and 66) until it passes through hub 77, whereupon swinging latch 76 is engaged with neck 69 below head 70. This is followed by reversal of said upper power cylinder 55 so that piston rod 56 pulls downward on the pressure bar 74 and forces the upper matrix half 42 into positive mating contact with the lower matrix half 41. Upon such mating of the matrix halves, the locking ring 43 is engaged and closure of the mold, with the tire therein, is complete; the pressure bar 74 then being removed and rod 56 lowered by contraction of power cylinder 55.

Lastly, after inflating the tire, removing the upper disc 66, and retracting the locking plates 25 to release the pins 45, the mold—with a tire therein—is crane-lifted off the pads 19 and 21 and returned to the dolly or the like by means of which the mold is transported to a vulcanizing station.

With the described tire mold loader used in the above manner, a prepared tire can be readily and conveniently inserted, in properly centered relation, in a mold and without undue manual effort by the operator.

Further, the loader is designed to be used with molds of different diameters and where the locating and locking pins 45 thus vary in spacing; such differential spacing being accommodated by engagement of such pins through corresponding holes 24 in the rows thereof. Also, for molds of different diameters, the outer and removable portion of the disc 65, and the disc 66, are replaced by others of proper outside diameter.

While herein identified as a tire mold loader, and so described, the apparatus is equally effective for unloading a tire from the mold; this being accomplished by merely undertaking—in reverse order—the sequential steps of the tire loading operation.

From the foregoing description, it will be readily seen that there has been produced such an apparatus as substantially fulfills the objects of the invention, as set forth herein.

While this specification sets forth in detail the present and preferred construction of the apparatus, still in practice such deviations from such detail may be resorted to as do not form a departure from the spirit of the invention, as defined by the appended claims.

Having thus described the invention, the following is claimed as new and useful and upon which Letters Patent is desired:

1. An apparatus for use in the loading of a prepared tire into a horizontally disposed, annular mold having a lower matrix half and a complementary upper matrix half; said apparatus comprising a frame, a structure on the frame to receive and horizontally support the lower matrix half, a vertical-axis power cylinder unit supported from said structure in depending relation to said lower matrix half, a lower tire-bead engaging disc, control means connected to said disc to move the same up and down, an upper tire-bead engaging disc, a piston rod projecting upwardly from the cylinder unit and through said lower disc and said upper disc, means to releasably latch the piston rod to the upper disc, an initially separate pressure bar adapted to be engaged in spanning relation atop the upper matrix half upon placement of the latter above the lower matrix half and over a tire therein, the piston rod being movable upwardly from the upper disc and through the bar upon release of the latch means, and other means included in part with the first named latch means to releasably latch the piston rod to the pressure bar.

2. In a vertical-axis apparatus for use in the loading of a prepared tire into a horizontally disposed, annular mold which includes a lower matrix half, a mold supporting structure including diametrally opposed pads each having a plurality of openings therethrough disposed in a row radially of and spaced different distances from the axis of the mold, a pin depending from the lower matrix half on each side thereof in position to pass through and project below correspondingly spaced holes in the pads, the pins having circumferential grooves exposed beneath the pads, locking plates slidably mounted beneath the pads for movement in a direction tangentially of the mold, each plate having notches open to one end thereof to aline and register with all the pad openings when the plate is advanced and adapted to then engage the related pin groove in latching relation, and means to control the sliding movement of all the plates simultaneously from exteriorly of the apparaus at one side thereof.

References Cited in the file of this patent

UNITED STATES PATENTS

| | | |
|---|---|---|
| 2,147,339 | Glynn | Feb. 14, 1939 |
| 2,302,133 | Maze | Nov. 17, 1942 |
| 2,509,830 | MacMillan | May 30, 1950 |
| 2,743,481 | Hawkinson | May 1, 1956 |
| 2,778,063 | Duerksen | Jan. 22, 1957 |
| 2,923,527 | Fannen | Feb. 2, 1960 |
| 2,936,484 | Lawson | May 17, 1960 |
| 2,948,924 | Clapp | Aug. 16, 1960 |
| 2,987,770 | Powell | June 13, 1961 |
| 3,015,130 | Voth | Jan. 2, 1962 |
| 3,065,499 | Brundage et al. | Nov. 27, 1962 |
| 3,091,801 | Erickson | June 4, 1963 |